US011908358B2

(12) United States Patent
Shin et al.

(10) Patent No.: US 11,908,358 B2
(45) Date of Patent: Feb. 20, 2024

(54) GATE TEST PART AND DISPLAY DEVICE INCLUDING THE SAME

(71) Applicant: Samsung Display Co., Ltd., Yongin-Si (KR)

(72) Inventors: Kwan-Yup Shin, Yongin-si (KR); Jun-Ho Bae, Asan-si (KR); Mi-Sun Lee, Sejong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/152,236

(22) Filed: Jan. 19, 2021

(65) Prior Publication Data

US 2021/0343204 A1 Nov. 4, 2021

(30) Foreign Application Priority Data

May 4, 2020 (KR) ........................ 10-2020-0053375

(51) Int. Cl.
*G09G 3/36* (2006.01)
*G09G 3/00* (2006.01)

(52) U.S. Cl.
CPC ........... *G09G 3/006* (2013.01); *G09G 3/3648* (2013.01); *G09G 2300/0426* (2013.01); *G09G 2330/12* (2013.01)

(58) Field of Classification Search
CPC ................. G09G 3/006; G09G 3/3648; G09G 2300/0426; G09G 2330/12; G09G 2330/06
See application file for complete search history.

(56) References Cited

U.S. PATENT DOCUMENTS 7,301,523 B2 * 11/2007 Kamei ................ G02F 1/13318 345/207
9,366,928 B2 * 6/2016 Zhang ................... G02F 1/1309
9,678,372 B2 * 6/2017 Fu .......................... G02F 1/1362
11,650,629 B2 * 5/2023 Kwon ..................... G09F 9/301 361/679.02
2004/0095303 A1 * 5/2004 Moon .................. G09G 3/3648 345/87
2004/0095549 A1 * 5/2004 Moon ................... G02F 1/1345 349/192
2006/0186913 A1 * 8/2006 Kim ....................... G09G 3/006 324/760.02
2006/0284633 A1 * 12/2006 Park ....................... G09G 3/006 324/760.02
2007/0018680 A1 * 1/2007 Jeon ....................... G09G 3/006 324/760.02
2009/0002586 A1 * 1/2009 Kimura ............. G02F 1/136213 349/39

(Continued)

FOREIGN PATENT DOCUMENTS

KR 10-2017-0081057 A 7/2017

*Primary Examiner* — Jose R Soto Lopez
(74) *Attorney, Agent, or Firm* — Innovation Counsel LLP

(57) ABSTRACT

A gate test part includes a plurality of composite pads electrically connected to a plurality of gate lines. The gate lines extend in a first direction and are disposed along a second direction crossing the first direction. Each of the composite pads includes an antistatic pad, a first test pad spaced apart from the antistatic pad and providing a gate test signal to each of the gate lines, and a second test pad overlapping the antistatic pad and the first test pad. The second test pad electrically connects the antistatic pad and the first test pad.

17 Claims, 7 Drawing Sheets

(56) References Cited

U.S. PATENT DOCUMENTS

| | | | | |
|---|---|---|---|---|
| 2009/0115690 | A1* | 5/2009 | Chang | G09G 3/006 345/55 |
| 2012/0056858 | A1* | 3/2012 | Ahn | G09G 3/3677 345/204 |
| 2013/0076717 | A1* | 3/2013 | Oikawa | G09G 3/36 345/87 |
| 2013/0092937 | A1* | 4/2013 | Lee | G09G 3/006 257/E23.179 |
| 2014/0021870 | A1* | 1/2014 | An | G09G 3/3233 315/161 |
| 2014/0210807 | A1* | 7/2014 | Kim | H01L 29/4232 345/212 |
| 2015/0084666 | A1* | 3/2015 | Kim | G09G 3/36 257/48 |
| 2015/0144915 | A1* | 5/2015 | Lee | G02F 1/136204 257/40 |
| 2015/0199929 | A1* | 7/2015 | Kim | G09G 3/006 324/762.01 |
| 2016/0163279 | A1* | 6/2016 | Hong | G09G 3/20 345/212 |
| 2016/0321992 | A1* | 11/2016 | Kim | G09G 3/3225 |
| 2016/0328062 | A1* | 11/2016 | Jin | G06F 3/04164 |
| 2018/0331091 | A1* | 11/2018 | Wang | G09G 3/006 |
| 2019/0035352 | A1* | 1/2019 | Bei | G02F 1/136286 |
| 2019/0066595 | A1* | 2/2019 | Kim | G09G 3/006 |
| 2019/0213940 | A1* | 7/2019 | Veidhes | G02F 1/133345 |
| 2020/0004294 | A1* | 1/2020 | Tan | G06F 3/04164 |
| 2020/0057345 | A1* | 2/2020 | Lee | G02F 1/136286 |
| 2020/0105154 | A1* | 4/2020 | Sreenivasan | G06F 30/00 |
| 2020/0312205 | A1 | 10/2020 | Shin et al. | |
| 2020/0343326 | A1* | 10/2020 | Park | G09G 3/3266 |
| 2021/0134938 | A1* | 5/2021 | Kim | H10K 59/131 |
| 2021/0181559 | A1* | 6/2021 | Li | G02F 1/13452 |

* cited by examiner

GATE TEST PART AND DISPLAY DEVICE INCLUDING THE SAME

CROSS-REFERENCE TO RELATED APPLICATION(S)

This application claims priority from and the benefit of Korean Patent Application No. 10-2020-0053375, filed on May 4, 2020, which is hereby incorporated by reference for all purposes as if fully set forth herein.

BACKGROUND

1. Field

The present disclosure generally relates to a display device. More particularly, the present disclosure relates to a display device including a gate test part which has composite pads.

2. Description of the Related Art

In general, a display device includes a display panel displaying an image and a panel driver providing a signal to the display panel. The display panel may include a line transmitting the signal. In order to increase the yield of the display device, a testing device whether the line is defective may be added in a manufacturing process of the display device. In order to perform the test, a test part may be additionally disposed in the display device. In addition, since static electricity may be generated in the manufacturing process of the display device or may be generated during use of the display device, in order to protect the display panel and/or the panel driver from overcurrent caused by the static electricity, an antistatic part may be additionally disposed in the display device.

However, when the test part and the antistatic part are respectively disposed in the display device, a display area of the display device decreases and a non-display area increases. Thus, there is need to develop a novel display device that performs a defective test and protects the display device from the static electricity simultaneously without decreasing a display area.

The above information disclosed in this Background section is only for understanding of the background of the present disclosure, and, therefore, it may contain information that does not constitute prior art.

SUMMARY

Some embodiments provide a gate test part including composite pads.

Some embodiments provide a display device including the gate test part.

A gate test part according to an embodiment may include a plurality of composite pads electrically connected to a plurality of gate lines and the gate lines may extend in a first direction and may be disposed along a second direction crossing the first direction. Each of the composite pads may include an antistatic pad, a first test pad spaced apart from the antistatic pad and providing a gate test signal to each of the gate lines, and a second test pad overlapping the antistatic pad and the first test pad. The second test pad may electrically connect the antistatic pad and the first test pad.

According to an embodiment, the composite pads may be respectively connected to the gate lines.

According to an embodiment, the composite pads may be alternatively disposed in a zigzag pattern along the second direction.

According to an embodiment, the second test pad may be disposed on the antistatic pad and the first test pad.

According to an embodiment, the antistatic pad may include a same material as the first test pad.

According to an embodiment, lengths of the second test pad in the first direction and in the second direction may be about 100 um, respectively.

According to an embodiment, an area of the antistatic pad may be smaller than an area of the first test pad.

According to an embodiment, a length of the antistatic pad in the second direction may be equal to a length of the first test pad in the second direction.

According to an embodiment, a length of the antistatic pad in the first direction may be smaller than a length of the first test pad in the first direction.

According to an embodiment, the second test pad may contact the antistatic pad through a plurality of first contact holes and may contact the first test pad through a second contact hole.

According to an embodiment, an area of each of the first contact holes may be smaller than an area of the second contact hole.

A display device according to an embodiment may include a display panel including a plurality of gate lines, a gate driver adjacent to the display panel and providing a gate signal to the gate lines, and a gate test part including a plurality of composite pads, wherein the composite pads are electrically connected to the gate lines. Each of the composite pads may include an antistatic pad, a first test pad spaced apart from the antistatic pad and providing a gate test signal to each of the gate lines, and a second test pad overlapping the antistatic pad and the first test pad, the second test pad electrically connecting the antistatic pad and the first test pad.

According to an embodiment, the gate test part may be disposed between the display panel and the gate driver.

According to an embodiment, the display panel may further include a plurality of pixel electrodes disposed on the gate lines, and the second test pad may include a same material as the pixel electrodes.

According to an embodiment, the antistatic pad and the first test pad may include a same material as the gate lines.

According to an embodiment, the display panel may further include an active layer disposed on the gate lines, a source electrode disposed on the active layer, and a drain electrode disposed on the active layer and being spaced apart from the source electrode.

According to an embodiment, an area of the antistatic pad may be smaller than an area of the first test pad.

According to an embodiment, the gate lines may extend in a first direction and may be disposed along a second direction crossing the first direction, and a length of the antistatic pad in the second direction may be equal to a length of the first test pad in the second direction.

According to an embodiment, a length of the antistatic pad in the first direction may be smaller than a length of the first test pad in the first direction.

According to an embodiment, the second test pad may contact the antistatic pad through a plurality of first contact holes and may contact the first test pad through a second contact hole.

Therefore, the gate test part according to embodiments may include composite pads. Each of the composite pads may include an antistatic pad, a first test pad, and a second test pad. The second test pad may be electrically connected to the antistatic pad and the first test pad. As the first test pad is connected to the gate lines and the second test pad has a sufficient area, the gate test part may accurately test whether the gate lines are shorted and/or the short position.

In addition, as the antistatic pad and the first test pad are spaced apart from each other, the gate test part may protect the display panel and/or the gate driver from static electricity.

In addition, as the second test pad overlaps the antistatic pad and the first test pad, a non-display area in which the gate test part is disposed may be reduced.

It is to be understood that both the foregoing general description and the following detailed description are example and explanatory and are intended to provide further explanation of the present disclosure as claimed.

BRIEF DESCRIPTION OF THE DRAWINGS

The accompanying drawings, which are included to provide a further understanding of the present disclosure and are incorporated in and constitute a part of this specification, illustrate embodiments of the present disclosure, and together with the description serve to explain the present disclosure.

DETAILED DESCRIPTION

Illustrative, non-limiting embodiments will be more clearly understood from the following detailed description in conjunction with the accompanying drawings.

Figure 1:
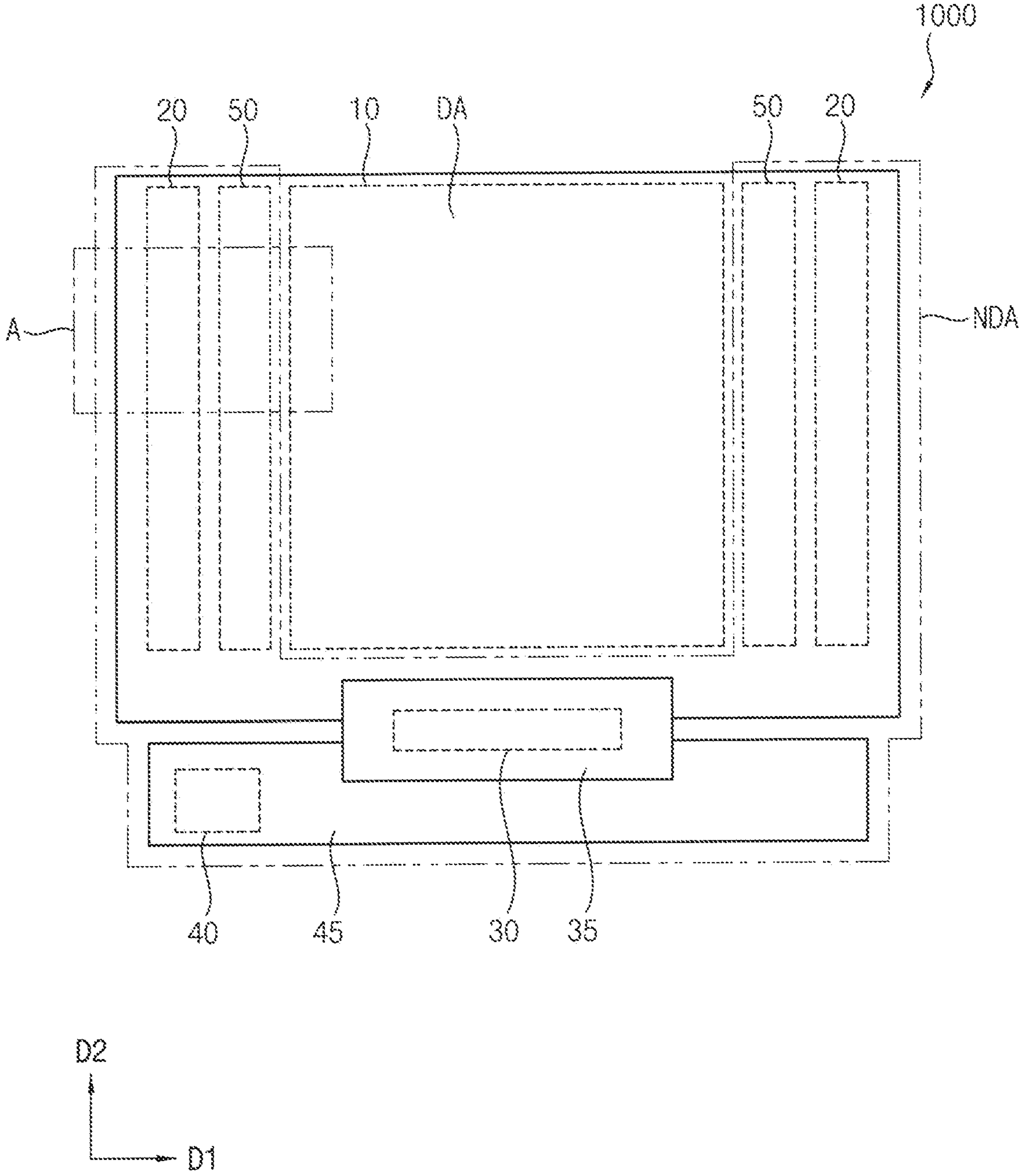
FIG. 1 is a plan view illustrating a display device according to an embodiment.
Figure 2:
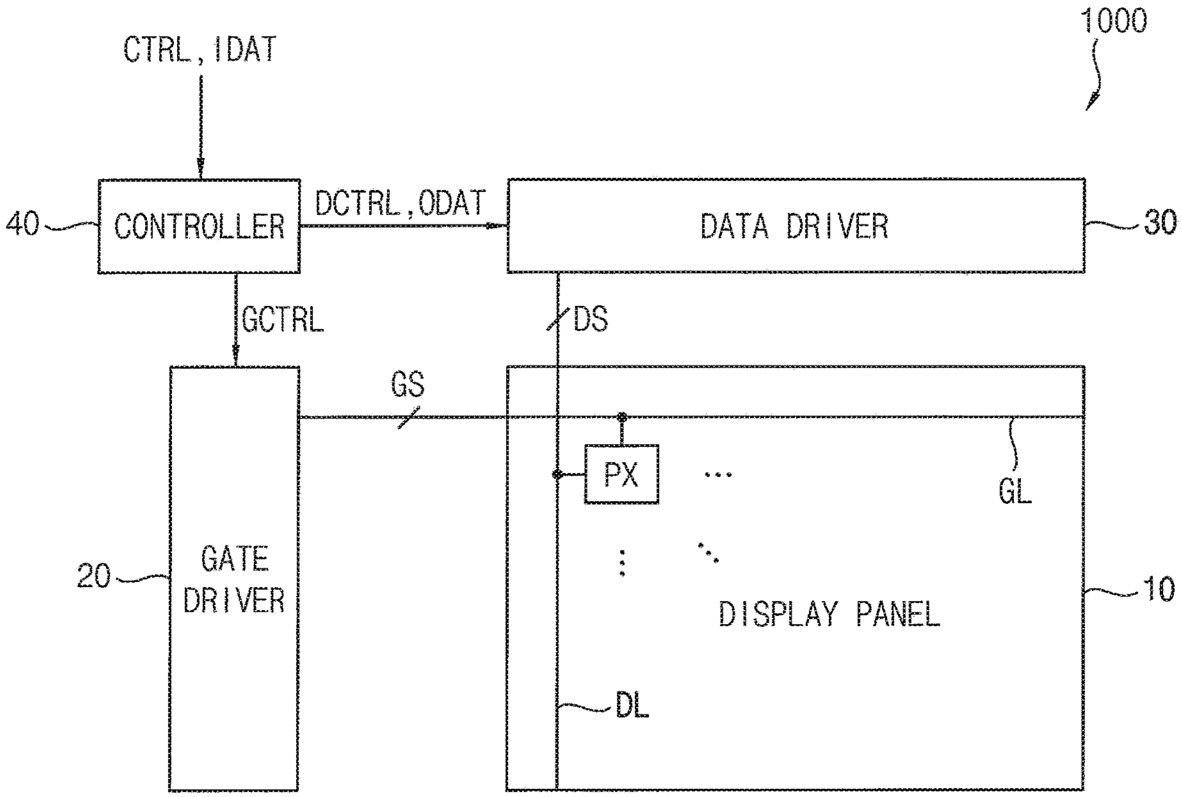
FIG. 2 is a block diagram illustrating the display device of FIG. 1.

FIG. 1 is a plan view illustrating a display device according to an embodiment. FIG. 2 is a block diagram illustrating the display device of FIG. 1.

Referring to FIGS. 1 and 2, a display device 1000 according to an embodiment may include a display panel 10 disposed in a display area DA and a panel driver disposed in a non-display area NDA. The panel driver may include a gate driver 20, a data driver 30, a timing controller 40, and a gate test part 50. The panel driver may provide a voltage and a signal to the display panel 10. The display panel 10 may receive the voltage and the signal to display an image.

The non-display area NDA may be disposed to surround the display area DA viewed on a plane. For example, the non-display area NDA may be disposed to surround a left edge, a right edge, and a bottom edge of the display area DA. In an embodiment, the gate driver 20 and the gate test part 50 may be disposed at the left edge and/or the right edge of the display area DA. Since the display device 1000 includes the gate test part 50 including a plurality of composite pads, an area of the gate test part 50 may be reduced compared to the prior art. Accordingly, the display device 1000 may secure an area of the display panel 10. In addition, in order to improve a display quality of the display device 1000, the display device 1000 may secure an area of the gate driver 20 or add a separate component to the non-display area NDA.

The display panel 10 may include a plurality of gate lines GL, a plurality of data lines DL, and a plurality of pixels PX. The pixels PX may be electrically connected to the gate lines GL and the data lines DL. For example, the gate lines GL may extend in a first direction D1 and may be disposed along a second direction D2 crossing the first direction D1. The data lines DL may extend in the second direction D2 and may be disposed along the first direction D1. The pixels PX may be disposed at a point where the gate lines GL and the data lines DL intersect. In an embodiment, the display panel 10 may be a liquid crystal display ("LCD") panel. In another embodiment, the display panel 10 may be an organic light emitting display ("OLED") panel, or any other display panel.

The gate driver 20 may receive a gate control signal GCTRL from the timing controller 40. For example, the gate control signal GCTRL may include a vertical start signal and a scan clock signal. The gate driver 20 may generate a gate signal GS based on the gate control signal GCTRL. The gate signal GS may be provided to the pixels PX through the gate lines GL. For example, the gate driver 20 may sequentially provide the gate signal GS to the gate lines GL in row units. In an embodiment, the gate driver 20 may be integrated or formed in the non-display area NDA. For example, the gate driver 20 may be disposed adjacent to the left and right edges of the display panel 10. Alternatively, the gate driver 20 may be disposed adjacent only to the left edge of the display panel 10.

The data driver 30 may receive a data control signal DCTRL and an output image data ODAT from the timing controller 40. For example, the data control signal DCTRL may include a horizontal start signal, an output data enable signal, and a load signal. The data driver 30 may generate a data voltage DS based on the data control signal DCTRL and the output image data ODAT. The data voltage DS may be provided to the pixels PX through the data lines DL. In an embodiment, the data driver 30 may be formed on a first printed circuit board 35. For example, the first printed circuit board 35 may be a flexible printed circuit board. The first printed circuit board 35 may be disposed adjacent to the bottom edge of the display area DA and may be bent.

The timing controller 40 may receive a control signal CTRL and an input image data IDAT from an external device. For example, the control signal CTRL may include a vertical synchronization signal, a master clock signal, a horizontal synchronization signal, and an input data enable signal. For example, the input image data IDAT may be a RGB image data including red image data, green image data, and blue image data. The timing controller 40 may control the gate driver 20 and the data driver 30 based on the control signal CTRL and the input image data IDAT. In an embodiment, the timing controller 40 may be formed on a second printed circuit board 45. For example, the second printed circuit board 45 may contact the first printed circuit board 35. As the first printed circuit board 35 is bent, the second printed circuit board 45 may face a rear surface of the display panel 10.

The gate test part 50 may be disposed between the display panel 10 and the gate driver 20 in the non-display area NDA. For example, the gate test part 50 may be disposed between the display panel 10 and the gate driver 20 adjacent to the left edge of the display panel 10 and may be disposed between the display panel 10 and the gate driver 20 adjacent to the right edge of the display panel 10.

The gate test part 50 may electrically connect the display panel 10 and the gate driver 20. For example, the gate test part 50 may provide the gate signal GS generated in the gate driver 20 to the gate lines GL.

In an embodiment, the gate test part 50 may test whether each of the gate lines GL is defective. This will be described in detail with reference to FIG. 6.

In an embodiment, the gate test part 50 may prevent an overcurrent due to static electricity from flowing into the display panel 10 and/or the gate driver 20. For example, the static electricity may be generated during a manufacturing process of the display device 1000 or during use of the display device 1000. This will be described in detail with reference to FIG. 7.

Figure 3:
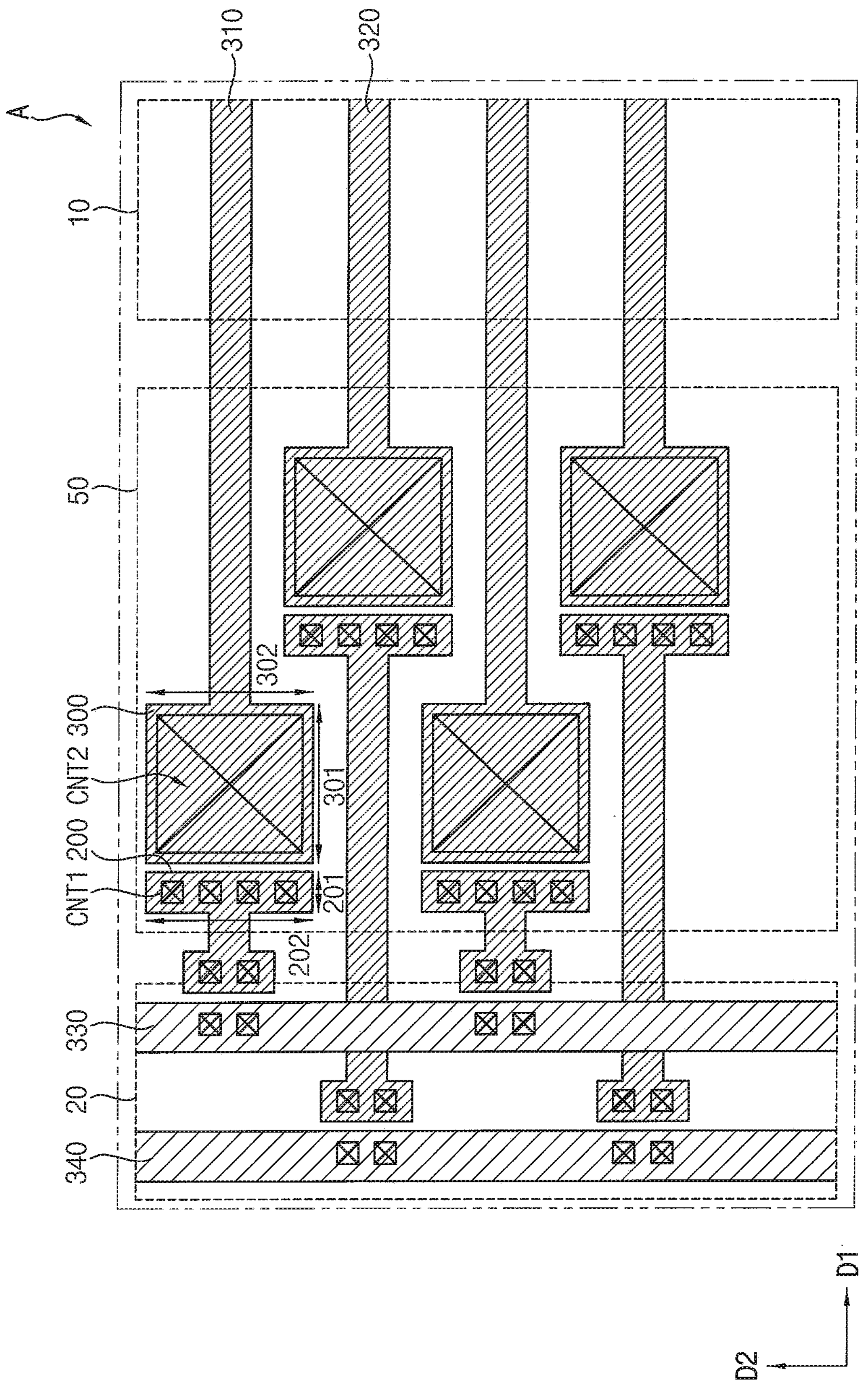
FIG. 3 and FIG. 4 are plan views illustrating a gate test part included in the display device of FIG. 1.
Figure 4:
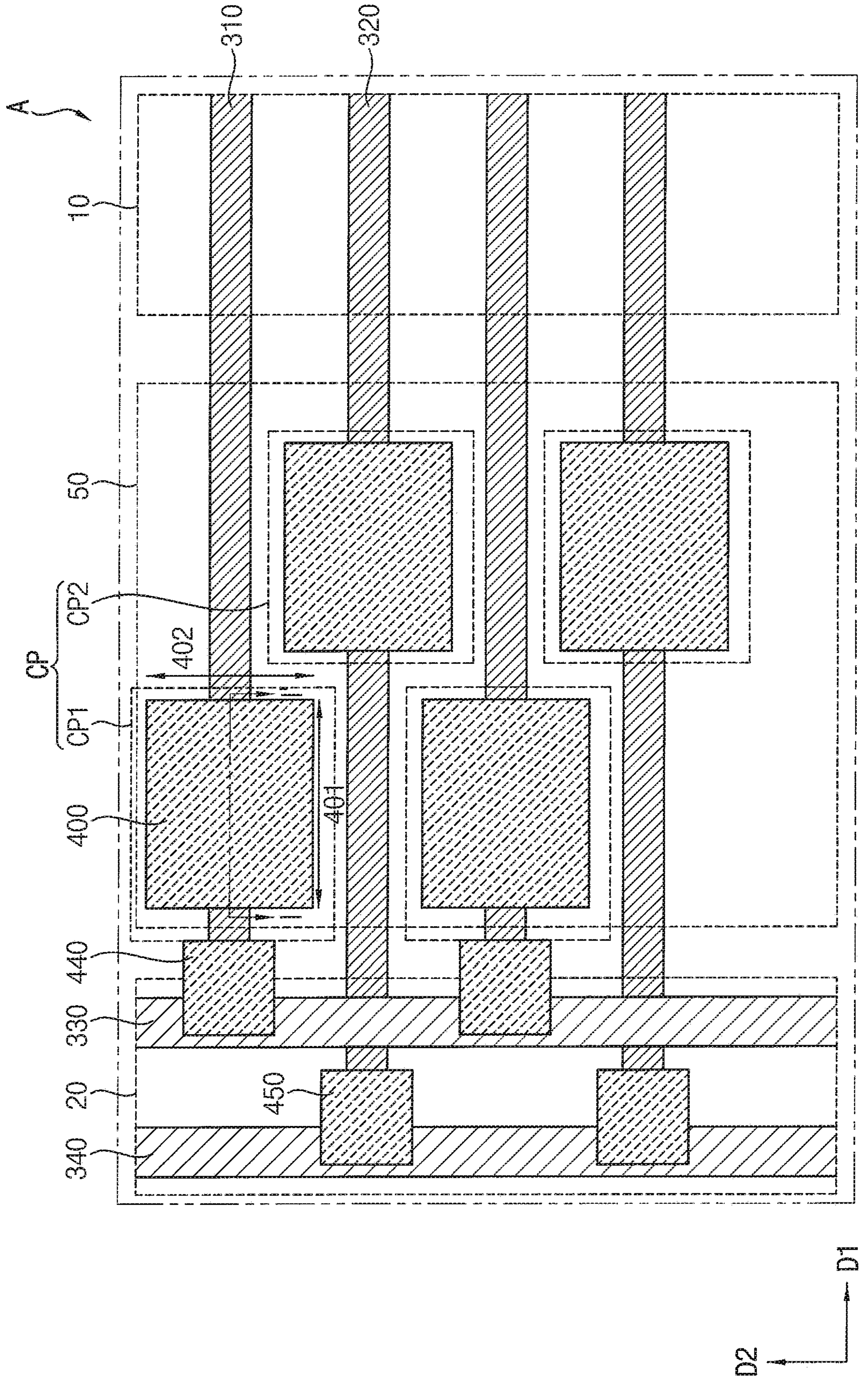

FIG. 3 and FIG. 4 are plan views illustrating a gate test part included in the display device of FIG. 1. For example, FIG. 3 and FIG. 4 may be enlarged views of area A of FIG. 1.

Referring to FIGS. 1, 3, and 4, the display device 1000 may include the display panel 10, the gate driver 20 disposed adjacent to the left edge and/or the right edge of the display panel 10, and the gate test part 50 disposed between the display panel 10 and the gate driver 20.

The gate test part 50 may include a plurality of composite pads CP. For example, as shown in FIG. 4, the composite pads CP may include a first composite pad CP1 and a second composite pad CP2. The composite pads CP may be connected to the gate lines GL, respectively.

The display panel 10 may include the gate lines GL. Each of the gate lines GL may receive the gate signal GS from the gate test part 50. For example, the gate lines GL may include a first gate line 310 and a second gate line 320. For example, the first composite pad CP1 may be connected to the first gate line 310, and the second composite pad CP2 may be connected to the second gate line 320. A first gate signal may be provided to the first gate line 310, and a second gate signal may be provided to the second gate line 320. For example, the first gate signal may be a storage voltage, and the second gate signal may be a control signal having a turn-on level pulse or a turn-off level pulse.

The gate driver 20 may include a first line 330 and a second line 340. In an embodiment, the first line 330 may provide the first gate signal to the first gate line 310, and the second line 340 may provide the second gate signal to the second gate line 320.

For example, the first line 330 may contact a first connection pattern 440 disposed on the first line 330 through contact holes exposing an upper surface of the first line 330. The first connection pattern 440 may contact a protrusion of an antistatic pad 200 included in the first composite pad CP1 through contact holes exposing the protrusion of the antistatic pad 200.

For example, the second line 340 may contact a second connection pattern 450 disposed on the second line 340 through contact holes exposing an upper surface of the second line 340. The second connection pattern 450 may contact a protrusion of an antistatic pad included in the second composite pad CP2 through contact holes exposing the protrusion of the antistatic pad.

In an embodiment, the first and second composite pads CP1 and CP2 are alternatively disposed along the second direction D1. That is, the first and second composite pads CP1 and CP2 may be disposed in a zigzag pattern along the second direction D2. For example, the first composite pads CP1 may overlap each other in the first direction D1 and may be repeatedly disposed along the second direction D2. The second composite pad CP2 may not overlap the first composite pad CP1 in the first direction D1, may overlap each other in the first direction D1, and overlap with each other in the second direction D2. As the first and second composite pads CP1 and CP2 are disposed in the zigzag pattern, a length of the gate test part 50 in the second direction D2 may be reduced. For example, the first and second composite pads CP1 and CP2 may partially overlap in the second direction D2.

The first composite pad CP1 may include the antistatic pad 200, a first test pad 300, and a second test pad 400. A structure of the second composite pad CP2 may be substantially equal to a structure of the first composite pad CP1. Thus, detailed description about the second composite pad CP2 is omitted.

For example, an electric signal may be transmitted through a path of the antistatic pad 200, the second test pad 400, and the first test pad 300. The electrical signal may include the first gate signal, the gate test signal, the overcurrent due to the static electricity, and the like.

In an embodiment, the antistatic pad 200 may have a rectangular shape. For example, the antistatic pad 200 may have a first length 201 in the first direction D1 and a second length 202 in the second direction D2. The first length 201 of the antistatic pad 200 may be smaller than the second length 202, and the second length 202 of the antistatic pad 200 may be substantially equal to a second length 402 of the first composite pad CP1 in the second direction D2.

In an embodiment, the antistatic pad 200 may contact the second test pad 400 through a plurality of first contact holes CNT1. When the antistatic pad 200 contacts the second test pad 400 through the first contact holes CNT1, loss of the electrical signal (e.g. the first gate signal) may be prevented.

In an embodiment, the first test pad 300 may be separated and spaced apart from the antistatic pad 200.

In an embodiment, the first test pad 300 may have a rectangular shape. For example, the first test pad 300 may have a first length 301 in the first direction D1 and a second length D2 in the second direction D2. The first length 301 of the first test pad 300 may be smaller than the second length 302, and the second length 302 of the first test pad 300 may be substantially equal to the second length 402 of the first composite pad CP1.

In an embodiment, an area of the antistatic pad 200 may be smaller than an area of the first test pad 300. For example, the first length 201 of the antistatic pad 200 may be smaller than the first length 301 of the first test pad 300. The second length 202 of the antistatic pad 200 may be substantially equal to the second length 302 of the first test pad 300. As the area of the first test pad 300 increases, a first test to be described later may be relatively easily performed.

In an embodiment, the first test pad 300 may contact the second test pad 400 through a second contact hole CNT2. An area of the second contact hole CNT2 may be larger than an area of each of the first contact holes CNT1. Accordingly, loss of the electrical signal (e.g., the gate test signal) can be prevented.

In an embodiment, the second test pad 400 may be disposed on the antistatic pad 200 and the first test pad 300, and may overlap the antistatic pad 200 and the first test pad 300. As described above, the second test pad 400 may electrically connect the antistatic pad 200 and the first test pad 300 through the first contact holes CNT1 and the second contact hole CNT2.

In an embodiment, the second test pad 400 may have a square shape. For example, the second test pad 400 may have a first length 401 in the first direction D1 and a second length 402 in the second direction D2. The first length 401 may be substantially equal to the second length 402. The second length 402 of the second test pad 400 is substantially equal to the second length of the first pad 300, and the first length 491 of the second pad 400 is greater than the first length 301 of the first pad. The area of the second test pad 400 is greater than the sum of the areas of the antistatic pad 200 and the first test pad 300. In an embodiment, the second test pad 400 may have an area of a predetermined size or more to perform a second test to be described later. However, as the area of the second test pad 400 increases, an area of the gate test part 50 may increase. Accordingly, the first and second lengths 401 and 402 of the second test pad 400 may be about 100 um, respectively.

Figure 5:
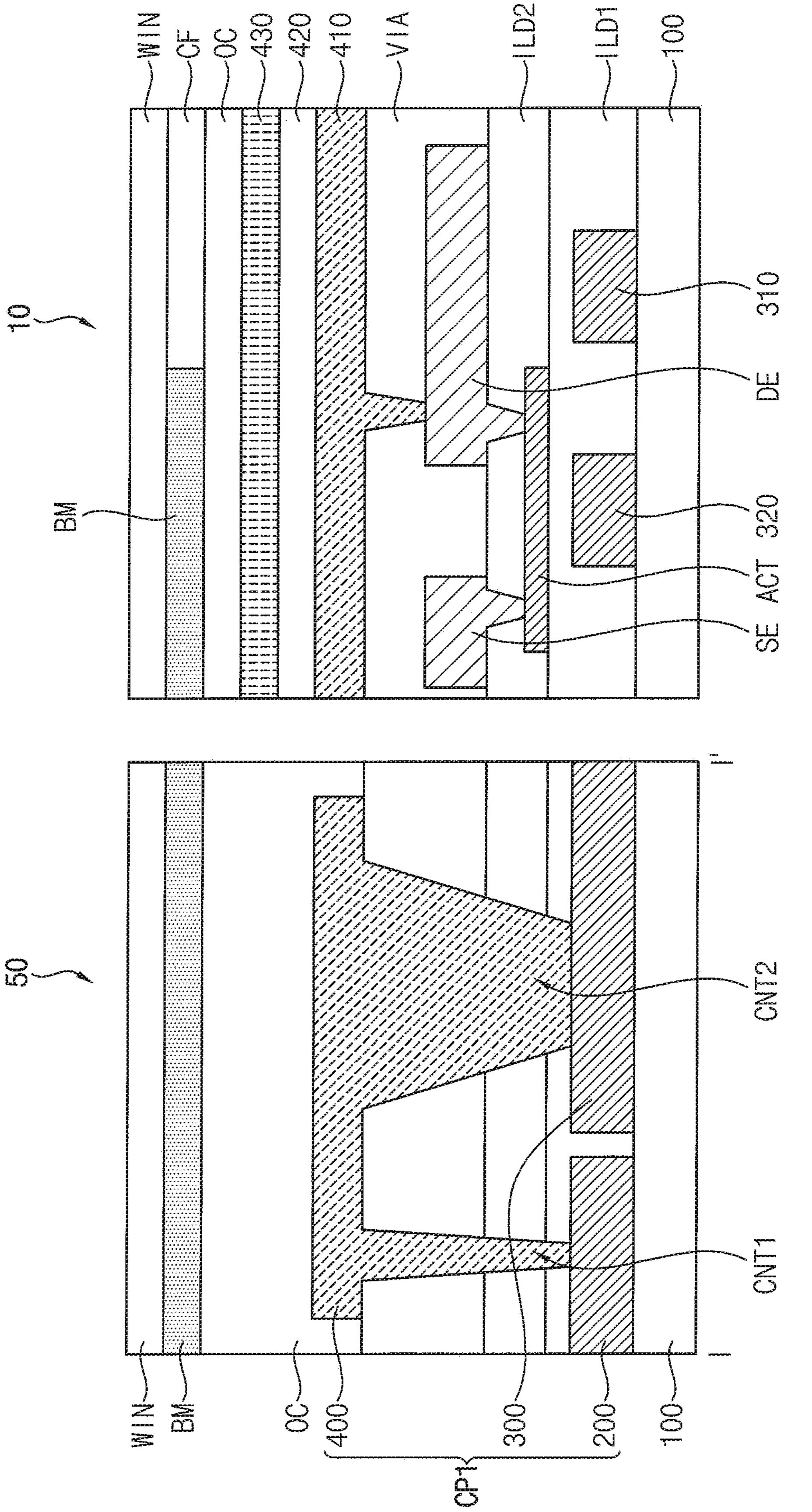
FIG. 5 is a cross-sectional view illustrating a gate test part and a display panel included in the display device of FIG. 1.

FIG. 5 is a cross-sectional view illustrating a gate test part and a display panel included in the display device of FIG. 1. For example, FIG. 5 is a cross-sectional view taken along line I-I' of FIG. 4.

Referring to FIGS. 1, 3, 4, and 5, the display panel 10 may include a substrate 100, the first gate line 310, the second gate line 320, a first insulating layer ILD1, an active layer ACT, a second insulating layer ILD2, a source electrode SE, a drain electrode DE, a via insulating layer VIA, a pixel electrode 410, a liquid crystal layer 420, a counter electrode 430, a planarization layer OC, a color filter CF, a black matrix BM, and a window WIN.

The substrate 100 may include a glass substrate, a quartz substrate, a plastic substrate, or the like. For example, when the substrate 100 includes the glass substrate, the display device 1000 may be a rigid display device. As another example, when the substrate 100 includes the plastic substrate, the display device 1000 may be a flexible display device. In this case, the substrate 100 may have a structure in which at least one organic film layer and at least one barrier layer are alternately stacked. For example, the organic film layer may include an organic material, and the barrier layer may include an inorganic material.

The first and second gate lines 310 and 320 may be disposed on the substrate 100. For example, the storage voltage may be provided to the first gate line 310 and the control signal may be provided to the second gate line 320. The first and second gate lines 310 and 320 may include a metal, an alloy, a conductive metal oxide, a transparent conductive material, or the like. For example, the first and second gate lines 310 and 320 may include silver ("Ag"), an alloy containing silver, molybdenum ("Mo"), an alloy containing molybdenum, aluminum ("Al"), an alloys containing aluminum, aluminum nitride ("AlN"), tungsten ("W"), tungsten nitride ("WN"), copper ("Cu"), nickel ("Ni"), chromium ("Cr"), chromium nitride ("CrN"), titanium ("Ti"), tantalum ("Ta"), platinum ("Pt"), scandium ("Sc"), indium tin oxide ("ITO"), indium zinc oxide ("IZO"), and the like.

The first insulating layer ILD1 may cover the first and second gate lines 310 and 320 and may be disposed on the substrate 100. The first insulating layer ILD1 may include an insulating material. For example, the first insulating layer ILD1 may include silicon oxide, silicon nitride, titanium oxide, tantalum oxide, or the like.

The active layer ACT may be disposed on the first insulating layer ILD1. For example, the active layer ACT may include amorphous silicon, polycrystalline silicon, or oxide semiconductor. Ions may be selectively implanted into the active layer ACT. For example, the ions may not be implanted in a region overlapping the second gate line 320, and the ions may be implanted in a region not overlapping the second gate line 320.

In an embodiment, the second insulating layer ILD2 may cover the active layer ACT and may be disposed on the first insulating layer ILD1. For example, the second insulating layer ILD2 may include an insulating material. In another embodiment, the second insulating layer ILD2 may be omitted.

The source electrode SE and the drain electrode DE may be disposed on the second insulating layer ILD2. In an embodiment, the source and drain electrodes SE and DE may contact the active layer ACT through contact holes formed in the second insulating layer ILD2, respectively. In another embodiment, the second insulating layer ILD2 may be omitted, and the source and drain electrodes SE and DE may directly contact the active layer ACT without contact holes. The source and drain electrodes SE and DE may include a metal, an alloy, a conductive metal oxide, a transparent conductive material, and the like.

The second gate line 320, the active layer ACT, the source electrode SE, and the drain electrode DE may constitute a transistor. For example, the data voltage DS may be provided to the source electrode SE and may be transmitted to the active layer ACT and the drain electrode DE in response to the control signal provided to the second gate line 320.

The via insulating layer VIA may cover the source and drain electrodes SE and DE, and may be disposed on the second insulating layer ILD2. The via insulating layer VIA may have a substantially flat top surface. For example, the via insulating layer VIA may include an organic insulating material. The via insulating layer VIA may include a photoresist, a polyacrylic resin, a polyimide resin, an acrylic resin, or the like.

The pixel electrode 410 may be disposed on the via insulating layer VIA. The pixel electrode 410 may contact the drain electrode DE through a contact hole formed in the via insulating layer VIA. The pixel electrode 410 may include a metal, an alloy, a conductive metal oxide, a transparent conductive material, or the like.

The liquid crystal layer 420 may be disposed on the pixel electrode 410. A plurality of liquid crystal molecules may be disposed inside the liquid crystal layer 420. An arrangement of each of the liquid crystal molecules may be changed according to an electric field formed by the pixel electrode 410 and the counter electrode 430. For example, when the electric field is not formed, each of the liquid crystal molecules may be arranged in a vertical direction. On the other hand, when the electric field is formed, each of the liquid crystal molecules may be arranged in a horizontal direction.

The counter electrode 430 may be disposed on the liquid crystal layer 420. The counter electrode 430 may receive a common voltage, and accordingly, the electric field may be formed between the pixel electrode 410 and the counter electrode 430. The counter electrode 430 may include a metal, an alloy, a conductive metal oxide, a transparent conductive material, or the like.

The planarization layer OC may be disposed on the counter electrode 430. The planarization layer OC may have a substantially flat top surface. Accordingly, the planarization layer OC may remove a step difference generated by the above-described configurations.

The color filter CF and the black matrix BM may be disposed on the planarization layer OC. The color filter CF may selectively transmit light having a predetermined wavelength. The black matrix BM may block light. The color filter CF may be disposed in an emission area of the display area DA and the black matrix BM may be disposed in a non-emission area of the display area DA, respectively. For example, as the black matrix BM is disposed so as to overlap the transistor, the transistor may not be visually recognized by the user.

The window WIN may be disposed on the color filter CF and the black matrix BM. The window WIN may prevent foreign matter and/or moisture from penetrating into the display device 1000. In addition, the window WIN may prevent an external shock from being transmitted to the inside of the display device 1000. For example, the window WIN may be formed of rigid glass.

The gate test part 50 may include the substrate 100, the first composite pad CP1, the planarization layer OC, the black matrix BM, and the window WIN. The first composite pad CP1 may include the antistatic pad 200, the first test pad 300, and the second test pad 400.

The antistatic pad 200 and the first test pad 300 may be disposed on the substrate 100. In an embodiment, the antistatic pad 200 and the first test pad 300 may include a same material as the first and second gate lines 310 and 320. For example, the antistatic pad 200 and the first test pad 300 may be formed together with the first and second gate lines 310 and 320.

The second test pad 400 may be disposed on the via insulating layer VIA. In an embodiment, the second test pad 400 may include a same material as the pixel electrode 410. For example, the second test pad 400 may be formed together with the pixel electrode 410.

In an embodiment, the second test pad 400 may include indium tin oxide ("ITO"). Accordingly, an electrical resistance of the second test pad 400 may be relatively small.

In an embodiment, the second test pad 400 may contact the antistatic pad 200 through the first contact holes CNT1. The first contact holes CNT1 may be formed in the first insulating layer ILD1, the second insulating layer ILD2, and the via insulating layer VIA, and may expose an upper surface of the antistatic pad 200.

In an embodiment, the second test pad 400 may contact the first test pad 300 through the second contact hole CNT2. The second contact hole CNT2 may be formed in the first insulating layer ILD1, the second insulating layer ILD2, and the via insulating layer VIA, and may expose an upper surface of the first test pad 300.

Meanwhile, a cross-sectional structure of the display panel 10 and the gate test part 50 may not be limited to the cross-sectional structure illustrated in FIG. 5. For example, the display panel 10 may further include a thin film encapsulation which is disposed on the counter electrode 430 and a sensing structure which is disposed on the thin film encapsulation. The thin film encapsulation may prevent penetration of oxygen and moisture. The sensing structure may detect touch or approach of an operator. In addition, the second test pad 400 may be formed in a layer different from a layer in which the pixel electrode 410 is formed. For example, the second test pad 400 may be formed together with the source and drain electrodes SE and DE.

Figure 6:
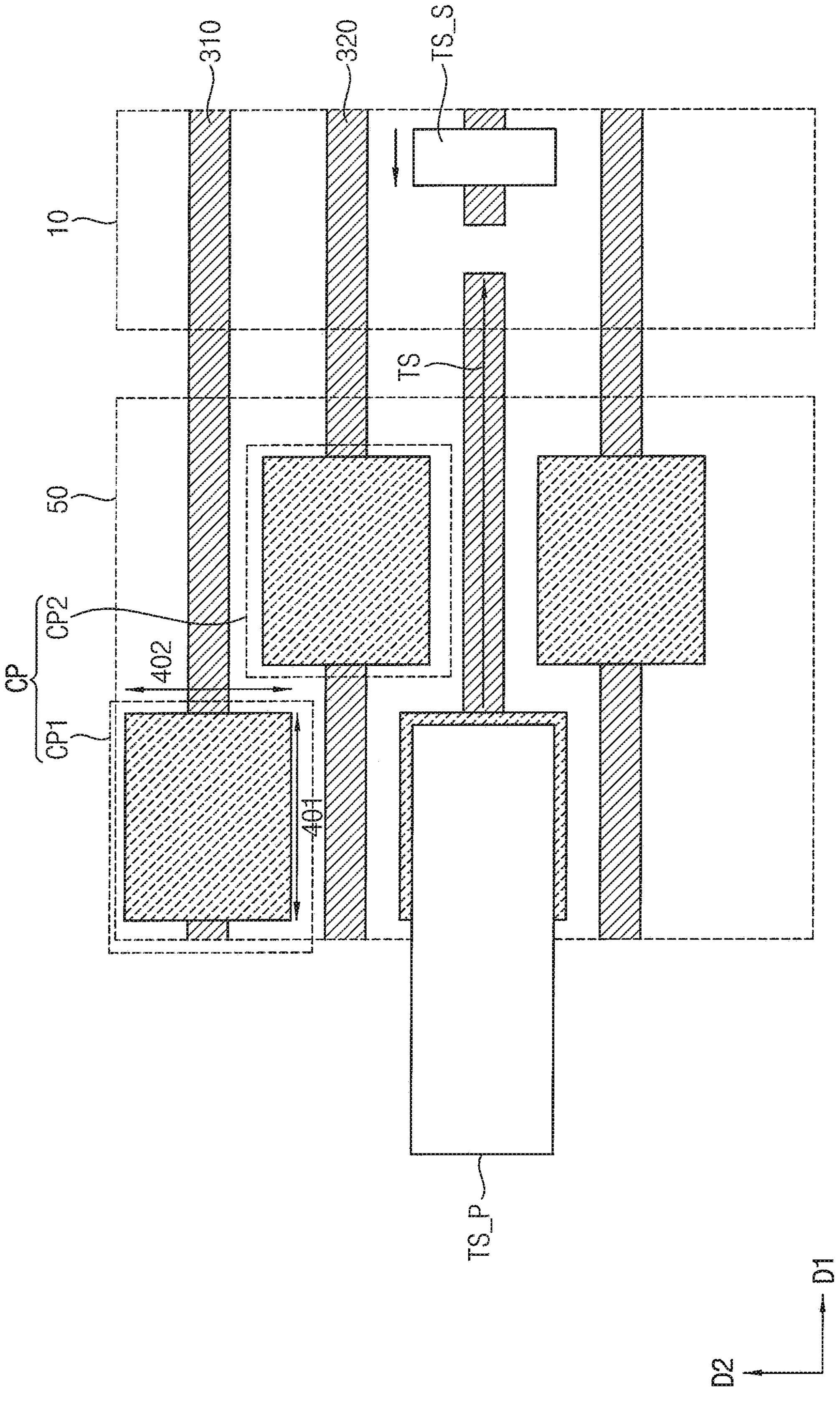
FIG. 6 is a plan view illustrating a method of testing gate lines included in the display device of FIG. 1.
Figure 7:
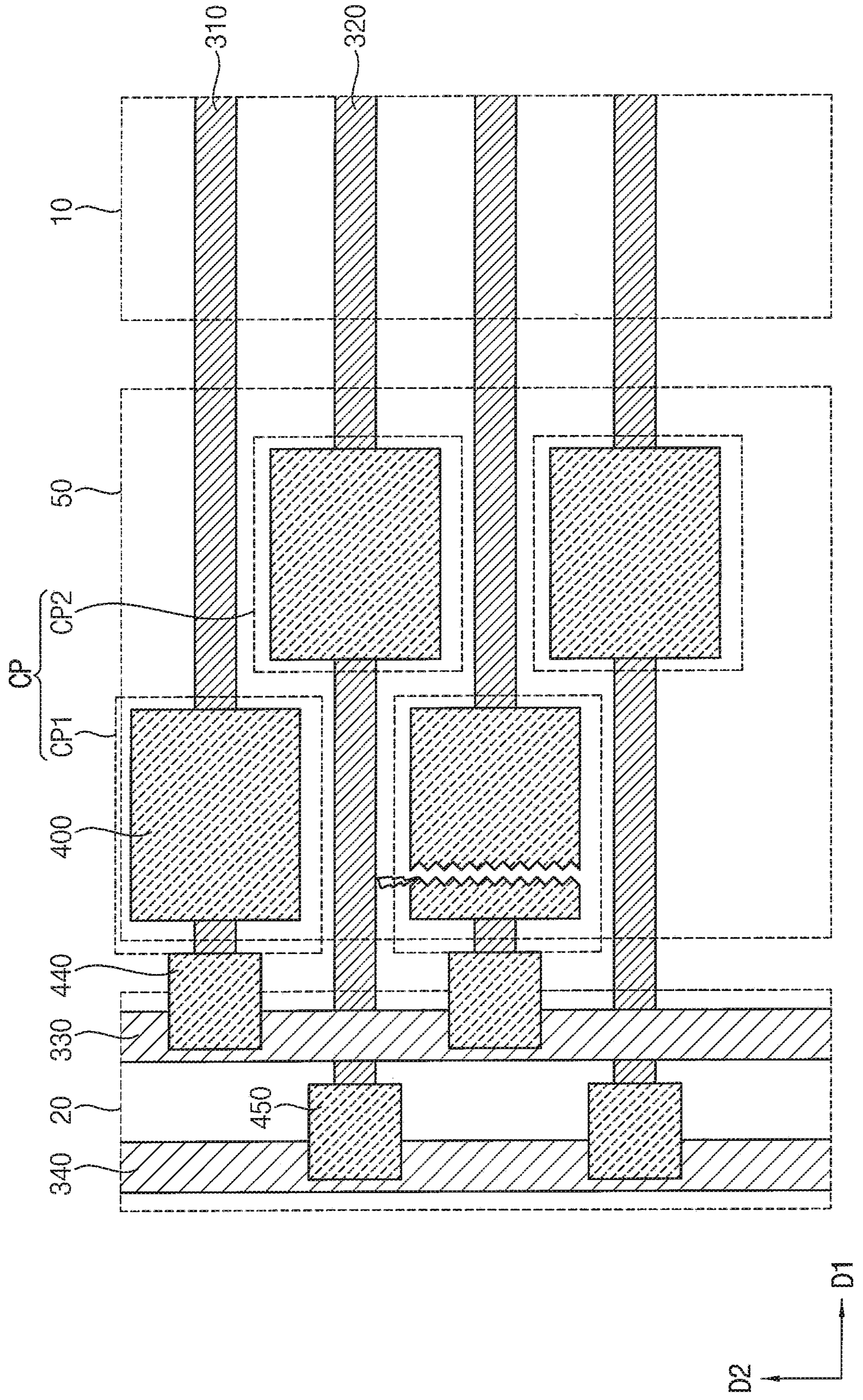
FIG. 7 is a plan view illustrating a method of protecting a display panel included in the display device of FIG. 1 from overcurrent due to static electricity.

FIG. 6 is a plan view illustrating a method of testing gate lines included in the display device of FIG. 1. FIG. 7 is a plan view illustrating a method of protecting a display panel included in the display device of FIG. 1 from overcurrent due to static electricity.

Referring to FIGS. 1 and 6, the gate test part 50 may test the gate lines GL. For example, a test may include the first test to check whether each of the gate lines GL is short, and the second test to check a location where the short has occurred. A gate test signal TS for performing the test may be provided to each of the gate lines GL. The gate test signal TS may include a first gate test signal for performing the first test and a second gate test signal for performing the second test.

While the first test is being performed, as shown in FIG. 1, the gate test part 50 adjacent to the left edge of the display panel 10 may provide the first gate test signal to the gate lines 50, and the gate test part 50 adjacent to the right edge of the display panel 10 may receive the first gate test signal. Depending on whether the first gate test signal is received, the gate test part 50 may test whether each of the gate lines GL is shorted.

While the second test is being performed, as shown in FIG. 6, the gate test part 50 adjacent to the left end of the display panel 10 may provide the second gate test signal to the gate line determined to be defective through the first test.

In order to accurately perform the test, a test feed sensor TS_P and a test receiving sensor TS_S may be used. In this case, the test feed sensor TS_P providing the test signal TS to the composite pad CP may contact the composite pad CP. When the test feed sensor TS_P contacts the composite pad CP, the test signal TS may be stably provided. In detail, when performing the second test, since the gate test part 50 needs to test the location where the short occurs, the test signal TS should be stably provided. As the composite pad CP has a sufficient area to be in contact with the test feed sensor TS_P, the test may be accurately performed.

Referring to FIGS. 1 and 7, the gate test part 50 may protect the display panel 10 and/or the gate driver 20 from the overcurrent due to the static electricity. For example, the static electricity may be generated during a manufacturing process of the display device 1000 or during use of the display device 1000. The overcurrent may be generated due to the static electricity.

Meanwhile, current may be provided to the display panel 10 through a path of the antistatic pad 200, the second test pad 400, and the first test pad 300. When the overcurrent is transmitted through the path, the second test pad 400 is damaged so that the overcurrent may not be provided to the display panel 10 anymore. Accordingly, the gate test part 50 may protect the display panel 10 from the overcurrent. In this case, the second test pad 400 may include a metal material having a relatively low electrical resistance. For example, the second test pad 400 may include indium tin oxide ("ITO"). In a similar way, the gate test part 50 may protect the gate driver 20.

The display device 1000 according to embodiments may include the gate test part 50 including the composite pads CP. Each of the composite pads CP may include the antistatic pad 200, the first test pad 300, and the second test pad 400. Accordingly, the gate test party 50 may test whether the gate lines GL are shorted and/or the short position, and may protect the display panel 10 and/or the gate driver 20 from the overcurrent due to the static electricity. In addition, since the second test pad 400 overlaps the antistatic pad 200 and the first test pad 100, the non-display area NDA in which the gate test part 50 may be reduced.

Although certain embodiments and implementations have been described herein, other embodiments and modifications will be apparent from this description. Accordingly, the present disclosure is not limited to such embodiments, but rather to the broader scope of the appended claims and various obvious modifications and equivalent arrangements as would be apparent to a person of ordinary skill in the art.

What is claimed is:

1. A gate test part comprising a plurality of composite pads electrically connected to a plurality of gate lines, wherein the gate lines extend in a first direction and are disposed along a second direction crossing the first direction; and a black matrix disposed on the composite pads, wherein each of the composite pads comprises:

an antistatic pad;

a first test pad separated and spaced apart from the antistatic pad and providing a gate test signal to each of the gate lines; and a second test pad overlapping the antistatic pad and the first test pad, the second test pad electrically connecting the antistatic pad and the first test pad, wherein an area of the antistatic pad is smaller than an area of the first test pad, wherein the second test pad contacts the antistatic pad through a plurality of first contact holes and contacts the first test pad through a second contact hole, and wherein an area of each of the first contact holes is smaller than an area of the second contact hole.

2. The gate test part of claim 1, wherein the composite pads are respectively connected to the gate lines.

3. The gate test part of claim 2, wherein the composite pads are alternatively disposed in a zigzag pattern along the second direction.

4. The gate test part of claim 1, wherein the second test pad is disposed on the antistatic pad and the first test pad.

5. The gate test part of claim 1, wherein the antistatic pad includes a same material as the first test pad.

6. The gate test part of claim 1, wherein lengths of the second test pad in the first direction and in the second direction is 100 um respectively.

7. The gate test part of claim 5, wherein the area of the first test pad is smaller than an area of the second test pad.

8. The gate test part of claim 7, wherein a length of the antistatic pad in the second direction is equal to a length of the first test pad in the second direction, and the length of the first pad in the second direction is equal to a length of the second test pad in the second direction.

9. The gate test part of claim 7, wherein a length of the antistatic pad in the first direction is smaller than a length of the first test pad in the first direction, and the length of the first test pad is smaller than a length of the second test pad in the first direction.

10. A display device comprising:

a display panel including a plurality of gate lines;

a gate driver adjacent to the display panel and providing a gate signal to the gate lines; and a gate test part including a plurality of composite pads and a black matrix disposed on the composite pads, wherein the composite pads are electrically connected to the gate lines, wherein each of the composite pads comprises:

an antistatic pad;

a first test pad separated and spaced apart from the antistatic pad and providing a gate test signal to each of the gate lines; and a second test pad overlapping the antistatic pad and the first test pad, the second test pad electrically connecting the antistatic pad and the first test pad through a plurality of contact holes, wherein an area of the antistatic pad is smaller than an area of the first test pad, wherein the second test pad contacts the antistatic pad through a plurality of first contact holes and contacts the first test pad through a second contact hole, and wherein an area of each of the first contact holes is smaller than an area of the second contact hole.

11. The display device of claim 10, wherein the gate test part is disposed between the display panel and the gate driver.

12. The display device of claim 10, wherein the display panel further includes a plurality of pixel electrodes disposed on the gate lines, and wherein the second test pad includes a same material as the pixel electrodes.

13. The display device of claim 12, wherein the antistatic pad and the first test pad includes a same material as the gate lines.

14. The display device of claim 12, wherein the display panel further includes:

an active layer disposed on the gate lines;

a source electrode disposed on the active layer; and a drain electrode disposed on the active layer and spaced apart from the source electrode.

15. The display device of claim 10, wherein the area of the first test pad is smaller than an area of the second test pad.

16. The display device of claim 15, wherein the gate lines extend in a first direction and are disposed along a second direction crossing the first direction, and wherein a length of the antistatic pad in the second direction is equal to a length of the first test pad in the second direction, and the length of the first test pad in the second direction is equal to a length of the second test pad.

17. The display device of claim 16, wherein a length of the antistatic pad in the first direction is smaller than a length of the first test pad in the first direction, and the length of the first test pad is smaller than a length of the second test pad in the first direction.

* * * * *